(12) United States Patent
Jeon et al.

(10) Patent No.: US 12,452,427 B2
(45) Date of Patent: Oct. 21, 2025

(54) METHOD AND APPARATUS FOR VIDEO CODING USING VERSATILE INFORMATION-BASED CONTEXT MODEL

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Jee Yoon Park, Seoul (KR); Yu Jin Lee, Suwon-si (KR); Seung Wook Park, Yongin-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 110 days.

(21) Appl. No.: 18/368,451

(22) Filed: Sep. 14, 2023

(65) Prior Publication Data
US 2024/0007636 A1   Jan. 4, 2024

Related U.S. Application Data

(63) Continuation of application No. PCT/KR2022/003787, filed on Mar. 17, 2022.

(30) Foreign Application Priority Data

Mar. 19, 2021  (KR) .......... 10-2021-0035974
Mar. 16, 2022  (KR) .......... 10-2022-0032599

(51) Int. Cl.
H04N 19/13   (2014.01)
H04N 19/70   (2014.01)
H04N 19/91   (2014.01)

(52) U.S. Cl.
CPC ............. *H04N 19/13* (2014.11); *H04N 19/70* (2014.11); *H04N 19/91* (2014.11)

(58) Field of Classification Search
CPC ......... H04N 19/13; H04N 19/70; H04N 19/91
See application file for complete search history.

(56) References Cited

U.S. PATENT DOCUMENTS 9,571,842 B2   2/2017   Lee et al.
9,591,310 B2   3/2017   Lee et al.
(Continued)

FOREIGN PATENT DOCUMENTS

| KR | 101867613 B1 | 6/2018 |
| KR | 101945447 B1 | 2/2019 |
| KR | 102165070 B1 | 10/2020 |

OTHER PUBLICATIONS

"Context-Based Adaptive Binary Arithmetic Coding in the H.264/AVC Video Compression Standard"—Marpe et al., IEEE Transactions on Circuits and Systems for Video Technology, vol. 13, No. 7, Jul. 2003 (Year: 2003).*

(Continued)

*Primary Examiner* — Mainul Hasan
(74) *Attorney, Agent, or Firm* — Lempia Summerfield Katz LLC

(57) ABSTRACT

A method and an apparatus for video coding using a video-characteristic-based context model are disclosed. The video coding method and the video coding apparatus determine a context model optimized for an individual video on the basis of information in which various characteristics of the indi- (Continued)

vidual video are reflected in entropy encoding and decoding using context adaptive binary arithmetic coding (CABAC).

9 Claims, 16 Drawing Sheets

(56) References Cited

U.S. PATENT DOCUMENTS

| | | | |
|---|---|---|---|
| 9,596,472 B2 | 3/2017 | Lee et al. | |
| 9,596,473 B2 | 3/2017 | Lee et al. | |
| 9,596,474 B2 | 3/2017 | Lee et al. | |
| 10,009,606 B2 | 6/2018 | Bulusu et al. | |
| 10,257,517 B2 | 4/2019 | Lee et al. | |
| 10,506,258 B2 | 12/2019 | Chiang et al. | |
| 11,361,471 B2 | 6/2022 | Mammou et al. | |
| 2013/0003860 A1* | 1/2013 | Sasai | H04N 19/176 375/240.24 |
| 2013/0027230 A1* | 1/2013 | Marpe | H04N 19/91 341/107 |
| 2014/0105272 A1 | 4/2014 | Bulusu et al. | |
| 2014/0177708 A1* | 6/2014 | Alshin | H04N 19/50 375/240.12 |
| 2014/0219335 A1 | 8/2014 | Lee et al. | |
| 2015/0139333 A1 | 5/2015 | Lee et al. | |
| 2015/0195539 A1 | 7/2015 | Lee et al. | |
| 2015/0195585 A1 | 7/2015 | Lee et al. | |
| 2015/0195586 A1 | 7/2015 | Lee et al. | |
| 2016/0277762 A1* | 9/2016 | Zhang | H04N 19/593 |
| 2017/0188031 A1 | 6/2017 | Lee et al. | |
| 2018/0324463 A1* | 11/2018 | Zhang | H04N 19/625 |
| 2019/0020900 A1 | 1/2019 | Chiang et al. | |
| 2019/0156520 A1 | 5/2019 | Mammou et al. | |
| 2019/0200043 A1* | 6/2019 | Egilmez | H04N 19/172 |
| 2020/0153885 A1* | 5/2020 | Lee | G06T 15/005 |
| 2020/0273208 A1 | 8/2020 | Mammou et al. | |
| 2021/0099709 A1* | 4/2021 | Nam | H04N 19/46 |
| 2021/0227222 A1* | 7/2021 | Lee | H04N 19/136 |

OTHER PUBLICATIONS

"Context-Based Adaptive Binary Arithmetic Coding in the H.264/AVC Video Compression Standard"—Marpe et al., IEEE Transactions n Circuits and Systems for Video Technology, vol. 13, No. 7, Jul. 2003 (Year: 2003).*

"Probability Interval Partitioning Entropy Coding Using Systematic Variable-To-Variable Length Codes"—Kirchhoffer et al., 2011 18th IEEE International Conference on Image Processing (Year: 2011).*

International Search Report and Written Opinion cited in corresponding PCT application No. PCT/KR2022/003787; Jun. 30, 2022; 11 pp.

* cited by examiner

METHOD AND APPARATUS FOR VIDEO CODING USING VERSATILE INFORMATION-BASED CONTEXT MODEL

CROSS-REFERENCE TO RELATED APPLICATIONS

This application is a Continuation of International Application No. PCT/KR2022/003787 filed on Mar. 17, 2022, which claims priority to Korean Patent Application No. 10-2021-0035974 filed on Mar. 19, 2021, and Korean Patent Application No. 10-2022-0032599 filed on Mar. 16, 2022, the entire disclosures of each of which are incorporated herein by reference.

TECHNICAL FIELD

The present disclosure relates to a video encoding method and an apparatus using a video-characteristic-based context model.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Meanwhile, the encoder encodes information such as a syntax element as various types of information necessary for restoration of a video into a bitstream and transmits the bitstream to a decoder. In this case, the encoder uses an entropy coding technology based on context adaptive binary arithmetic coding (CABAC). The CABAC is a method of searching for an optimal probability value by updating a probability under the assumption that superiority and inferiority exist in a probability of occurrence of symbol values 0 and 1 when a symbol is encoded. The CABAC uses a context model to designate an initial probability of occurrence of a symbol value and a probability update rate. However, in an existing entropy coding technology, since only limited information is used when a context model is set, an optimal probability value for the CABAC is not determined and coding efficiency is degraded. Therefore, a method of effectively setting the context model needs to be considered in order to overcome this problem and improve coding efficiency.

SUMMARY

The present disclosure seeks to provide a video coding method and an apparatus for determining a context model optimized for an individual video on the basis of information in which various characteristics of the individual video are reflected in entropy encoding and decoding using context adaptive binary arithmetic coding (CABAC).

At least one aspect of the present disclosure provides an entropy decoding method for a current block, performed by a video decoding apparatus. The entropy decoding method comprises setting a context model using existing information of the current block and high level video information of the current block. The context model designates an initial value of a symbol value occurrence probability. The entropy decoding method also comprises acquiring a bitstream. The entropy decoding method also comprises generating bins by decoding the bitstream using the symbol value occurrence probability. The entropy decoding method also comprises updating the symbol value occurrence probability according to a decoding result for the bins. The entropy decoding method also comprises generating a non-binary syntax element by inversely binarizing a bin string in which the bins have been sequentially combined, or generating a binary syntax element from the bin string.

Another aspect of the present disclosure provides an entropy decoding method for a current block, performed by a video decoding apparatus. The entropy decoding method comprises selecting one of a plurality of context models using versatile additional video information. The entropy decoding method also comprises setting the selected context model using existing information of the current block. The selected context model designates an initial value of a symbol value occurrence probability. The entropy decoding method also comprises acquiring a bitstream. The entropy decoding method also comprises generating bins by decoding the bitstream using the symbol value occurrence probability. The entropy decoding method also comprises updating the symbol value occurrence probability according to a decoding result for the bins. The entropy decoding method also comprises generating a non-binary syntax element by inversely binarizing a bin string in which the bins have been sequentially combined or comprises generating a binary syntax element from the bin string.

Yet another aspect of the present disclosure provides an entropy encoding method for a current block, performed by a video encoding apparatus. The entropy encoding method comprises setting a context model using existing information of the current block and high level video information of the current block. The context model designates an initial value of a probability of a symbol value. The entropy encoding method also comprises acquiring bins of syntax elements. The bins are sequentially extracted from a bin string generated by binarizing a non-binary syntax element or sequentially extracted from a binary syntax element. The entropy encoding method also comprises generating a bitstream by encoding the bins using the probability of the symbol value. The entropy encoding method also comprises updating the probability of the symbol value according to an encoding result for the bins.

As described above, the present disclosure provides a video coding method and an apparatus for determining a context model optimized for an individual video on the basis of information in which various characteristics of the individual video are reflected in entropy encoding and decoding using context adaptive binary arithmetic coding (CABAC) to improve the coding efficiency.

DETAILED DESCRIPTION

Figure 1:
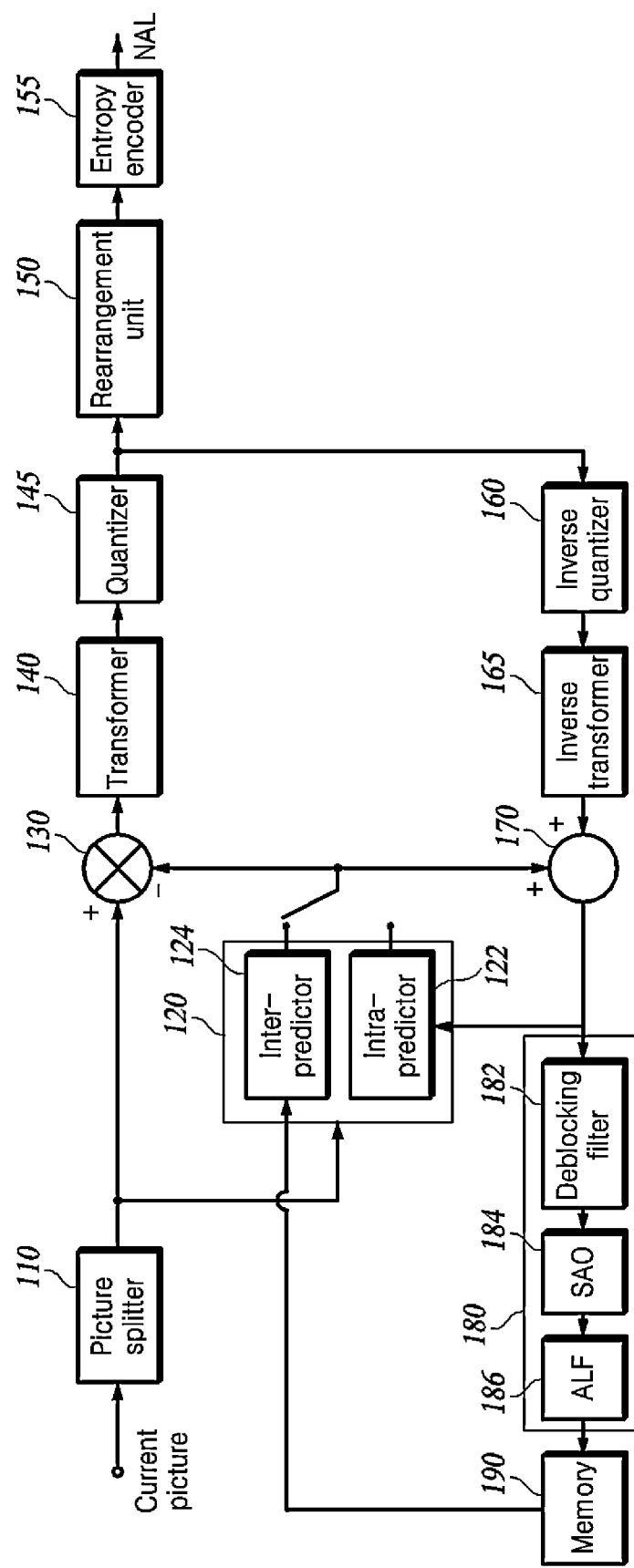
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions where considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
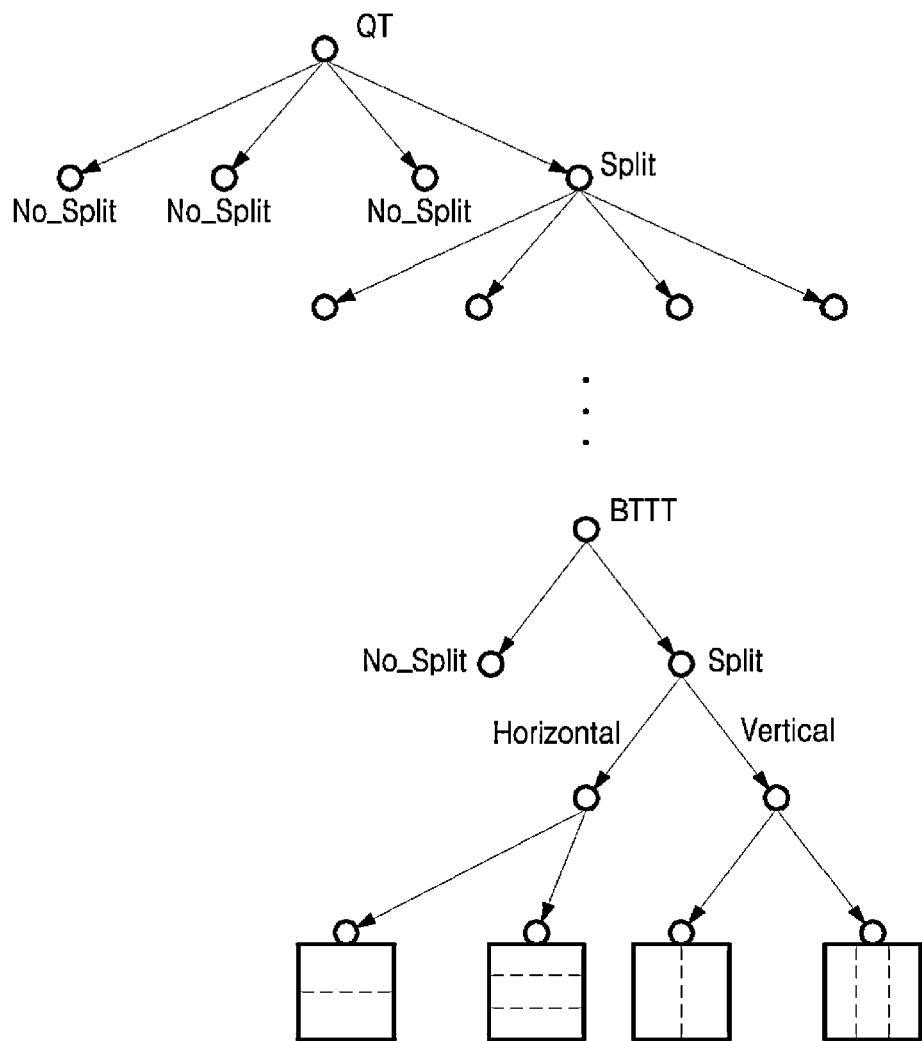
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
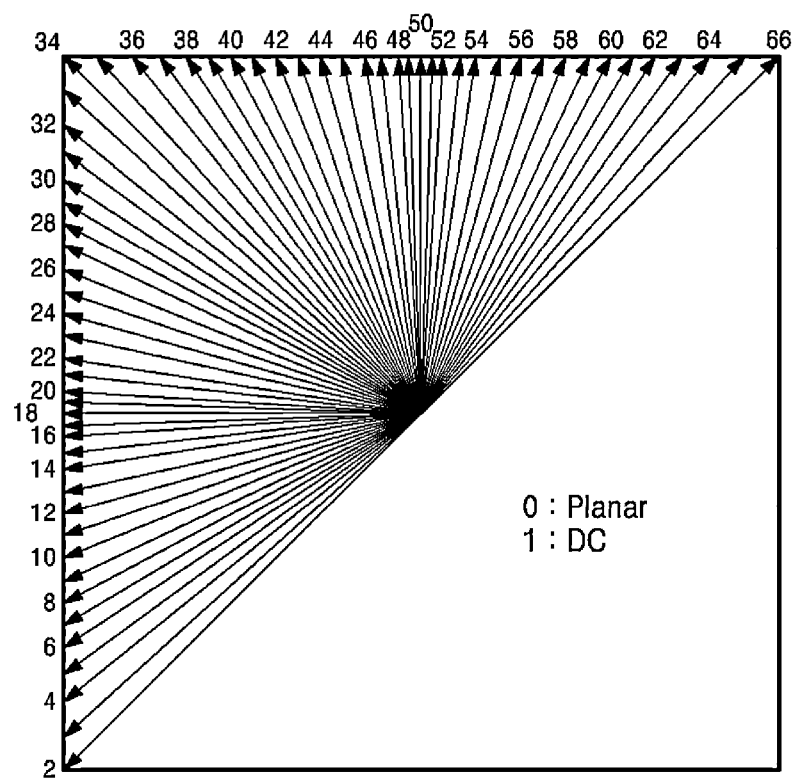
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
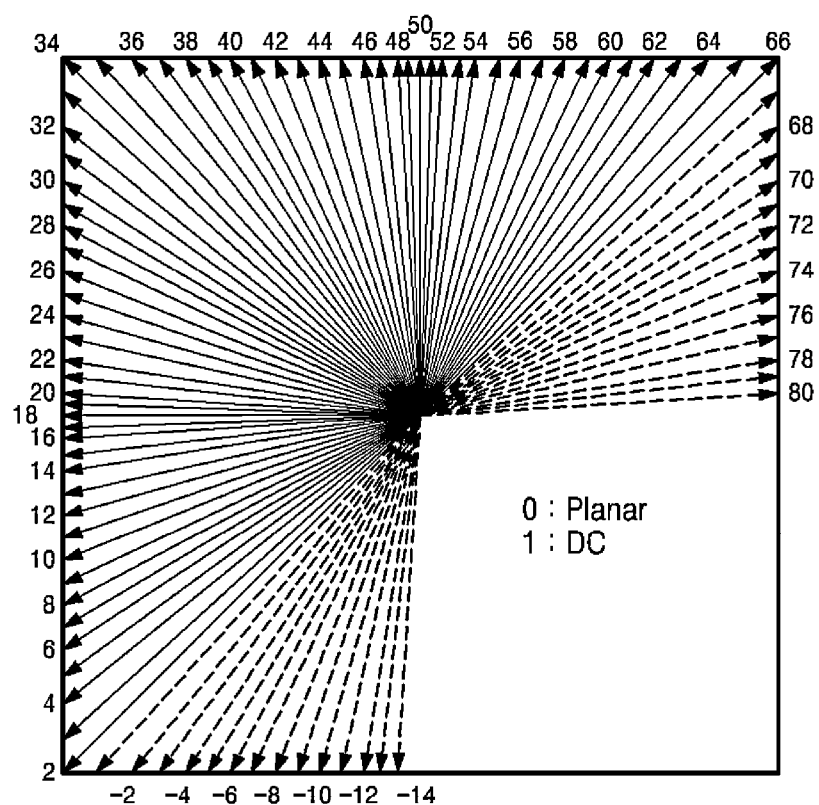

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
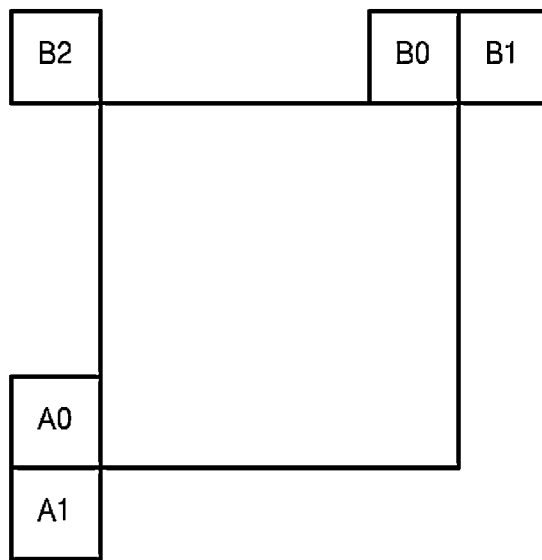
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_jdx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
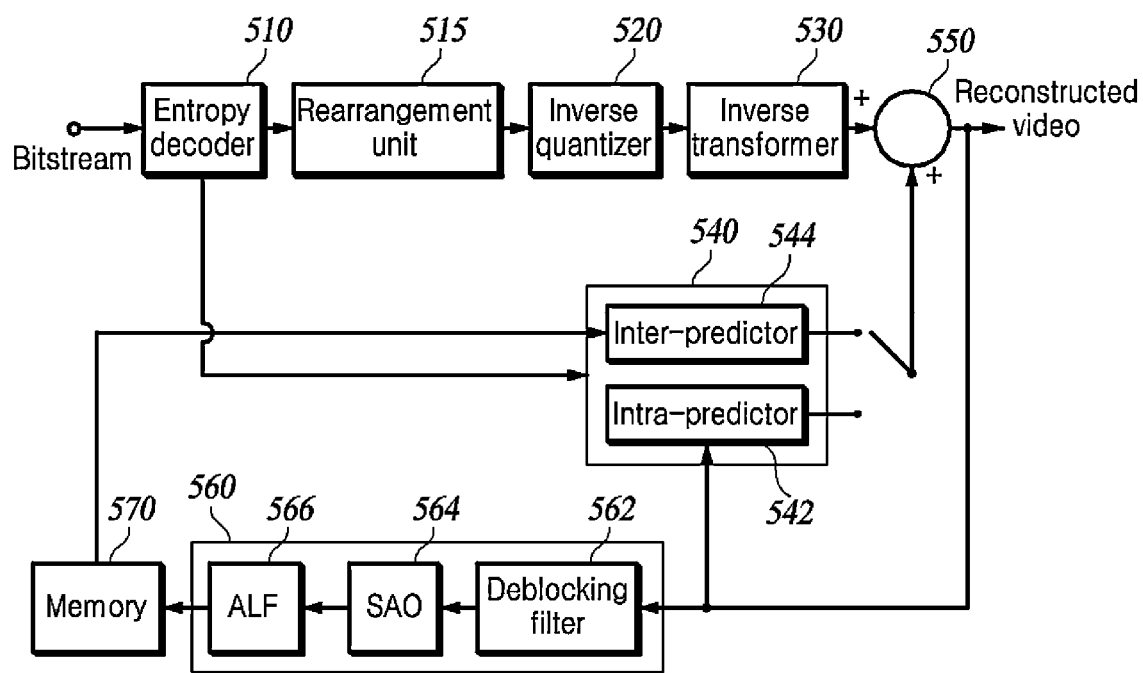
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus for determining a context model optimized for an individual video on the basis of information in which various characteristics of the individual video are reflected in entropy encoding and decoding using context adaptive binary arithmetic coding (CABAC).

The following embodiments may be applied to the entropy encoder 155 in the video encoding apparatus. Further, the embodiments can be applied to the entropy decoder 510 in the video decoding apparatus.

Hereinafter, the present realization examples are described focusing on entropy encoding in the video encoding apparatus. Such entropy encoding may be performed by the entropy encoder 155 in the video encoding apparatus. Meanwhile, when necessary for convenience of description, the video decoding apparatus is referred to. Nonetheless, most of the embodiments to be described below can be similarly applied to the entropy decoder 510 in the video decoding apparatus with the same or slight modifications. Meanwhile, the video encoding apparatus determines entropy encoding-related information (flags and indices to be described below) in terms of rate distortion optimization. Thereafter, the video encoding apparatus may encode the information to generate a bitstream and then may signal the bitstream to the video decoding apparatus. Further, the video encoding apparatus may acquire information related to entropy encoding from an high level to encode the current block.

I. Context Adaptive Binary Arithmetic Coding (CABAC)

The video encoding apparatus uses an entropy coding technology using context adaptive binary arithmetic coding (CABAC) in order to encode and transmit information, such as syntax elements into a bitstream.

Figure 6:
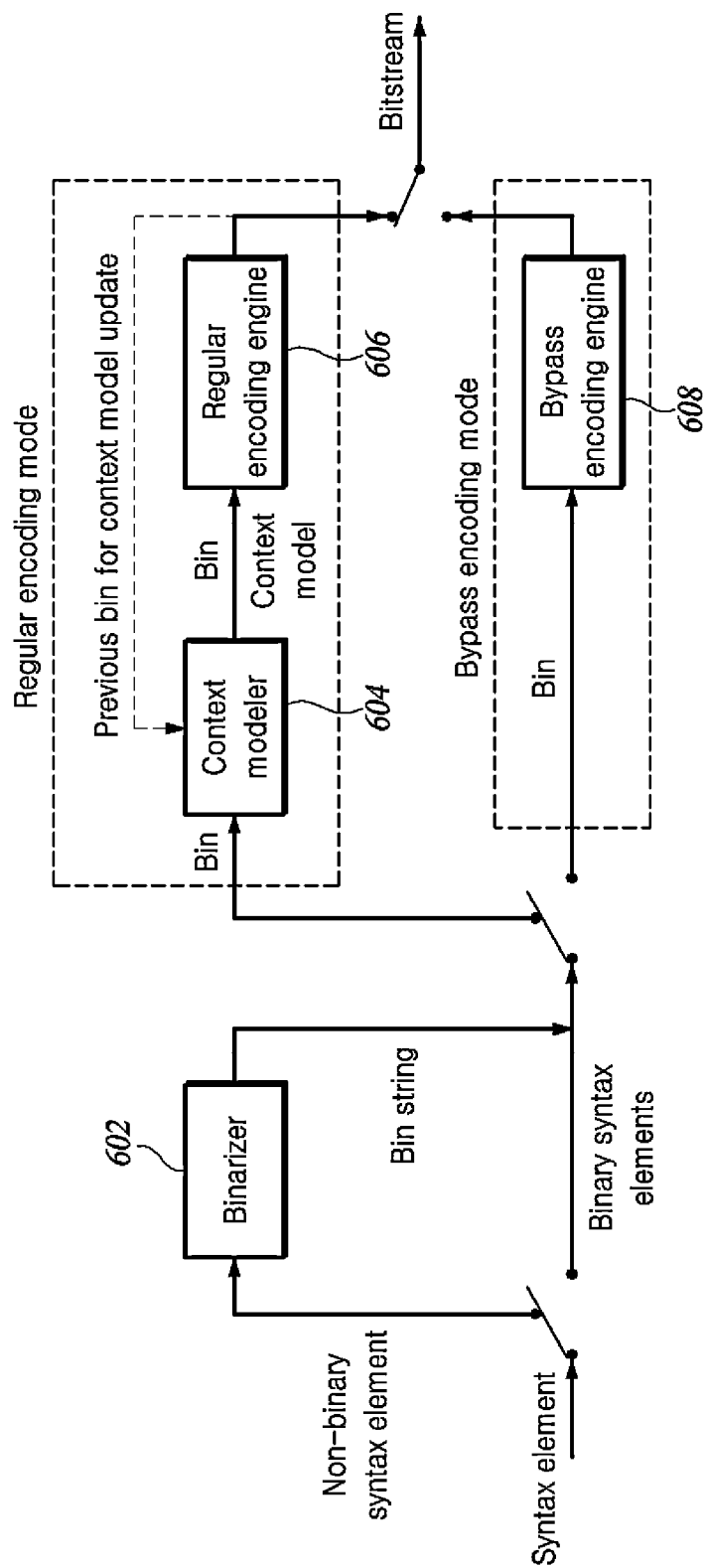
FIG. 6 is an illustrative diagram illustrating an entropy encoder.

FIG. 6 is an illustrative diagram illustrating an entropy encoder.

The entropy encoder 155 in the video encoding apparatus may include a binarizer 602, a context modeler 604, and a coding engine. The coding engine includes a context model based regular encoding engine 606 and a bypass encoding engine 608. Hereinafter, as illustrated in FIG. 6. Hereinafter, a process in which the regular encoding engine 606 performs CABAC is referred to as a regular encoding mode, and a process in which the bypass encoding engine 608 performs binary arithmetic encoding is referred to as a bypass encoding mode.

The binarizer 602 binarizes a non-binary syntax element configured to be entropy-encoded to generate a bin string. Bins sequentially extracted from a binary syntax element or the bin string are provided in the regular encoding mode or the bypass encoding mode. Hereinafter, bins and symbols can be used interchangeably.

In the regular encoding mode, a method of searching for an optimal probability value is used by updating a probability under the assumption that superiority and inferiority exist in a probability of occurrence of symbol values 0 and 1 when a symbol is encoded. Under the regular encoding mode, the entropy encoder 155 performs encoding on bins in an order of a setting of the context model, encoding of the bins, and probability update. Here, the context model designates the initial occurrence probability of the symbol value and a probability update rate. The context modeler 604 including the context model sets the context model and reflects the updated probability in the context model. The regular encoding engine 606 performs encoding on the bins.

The video encoding apparatus sets a context model using a ctxIdx value and determines the initial occurrence probability of the symbol value according to the set context model. The video encoding apparatus may encode the bin according to the probability value determined in this way and then may reflect an influence of an encoding result in the probability of the context model to use an updated probability when encoding the next bin. The video encoding apparatus transmits a bitstream in which the bins have been encoded to the video decoding apparatus. The video decoding apparatus may decode the bitstream to restore the bins through a process similar to that of the video encoding apparatus using the context model based on the ctxIdx value.

In the bypass coding mode, when a symbol is encoded, each probability of occurrence is fixed to 0.5 under the assumption that the probabilities of the occurrence of symbol values 0 and 1 are the same. The entropy encoder 155 entropy-encodes the bins using this fixed probability.

Using the two encoding methods, the video encoding apparatus may finally generate a bitstream that is transmitted to the video decoding apparatus.

Figure 7:
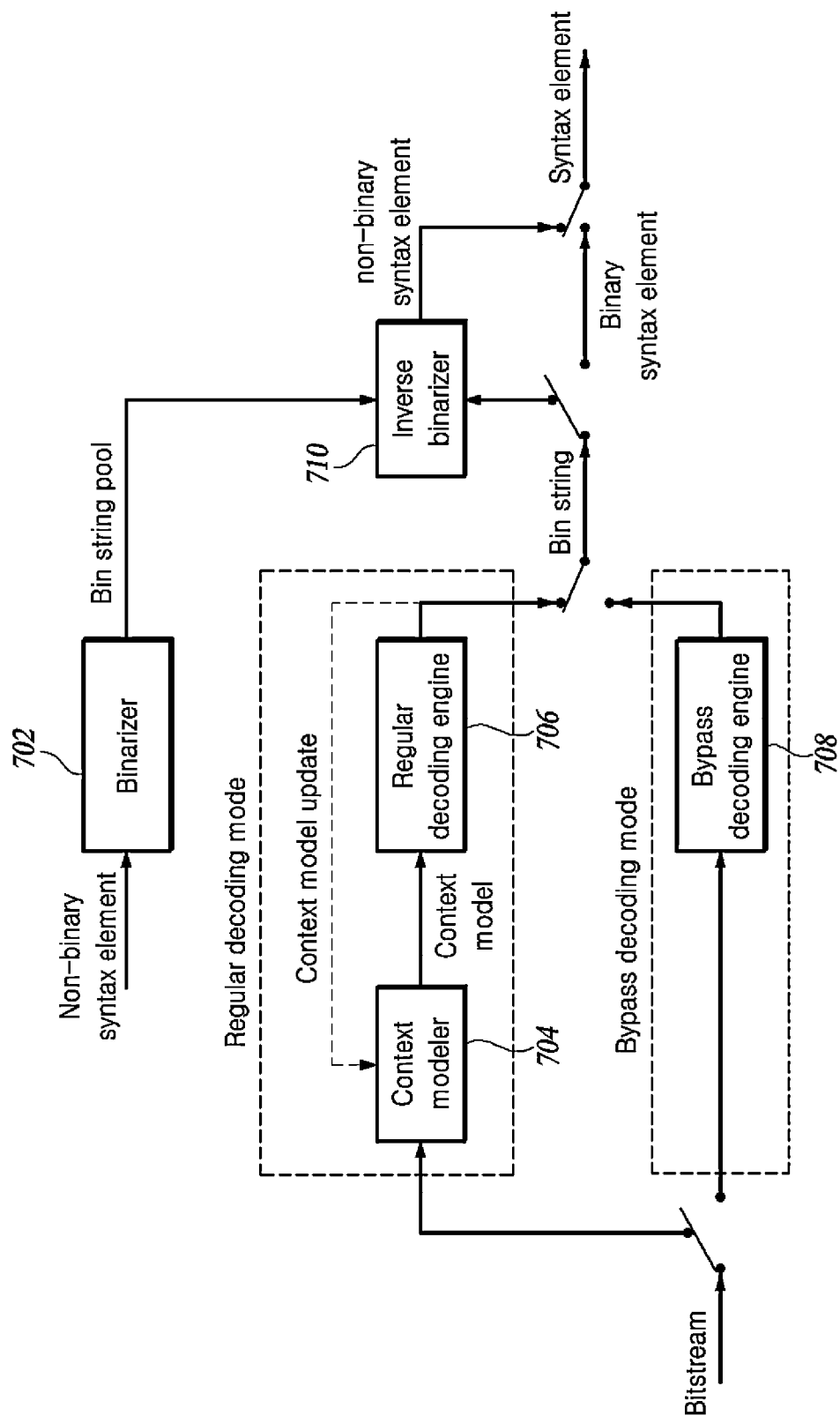
FIG. 7 is an illustrative diagram illustrating an entropy decoder.

FIG. 7 is an illustrative diagram illustrating the entropy decoder.

The entropy decoder 510 in the video decoding apparatus may include a binarizer 702, a context modeler 704, a coding engine, and an inverse binarizer 710. The coding engine includes a context model based regular decoding engine 706 and a bypass decoding engine 708. Hereinafter, as illustrated in FIG. 7, a process in which the regular decoding engine 706 performs CABAC is referred to as a regular decoding mode, and a process in which the bypass decoding engine 708 performs binary arithmetic encoding is referred to as a bypass decoding mode.

The binarizer 702 binarizes non-binary syntax elements configured to be entropy-decoded to generate a bin string pool. The bin string pool is provided to the inverse binarizer 710.

Roles of the context modeler 704 and the coding engine are similar to those of the context modeler 604 and the coding engine in the entropy encoder 155. Here, the entropy decoder 510 generates bins from the bitstream.

The inverse binarizer 710 compares the bin string generated by the regular decoding engine 706 with the bin string included in the bin string pool to generate a bin string corresponding to the bitstream. Further, the inverse binarizer 710 generates a non-binary syntax element from the decoded bin string.

Hereinafter, entropy encoding using CABAC performed by the video encoding apparatus will be described. As described above, in the case of a regular coding mode, the video encoding apparatus selects a context model suitable for a syntax element expressed by bins, and then, proceeds with encoding using the context model. Further, the video encoding apparatus reflects the encoding result of the corresponding bin in the context model to adjust the coding probability of the next bin.

To perform this process, initialization of the context model is performed first. The video encoding apparatus uses ctxIdx to initialize the context model of the syntax element.

In this case, ctxIdx may be determined according to syntax elements of the current block, the left block, and the top block. Meanwhile, the video decoding apparatus may determine ctxIdx as in the video encoding apparatus.

The video encoding apparatus determines initValue and shiftIdx in a look-up table (LUT) shown in Table 1 using ctxIdx as an index.

TABLE 1

| Initialization variable | ctxIdx of pred_mode_plt_flag | | |
|---|---|---|---|
| | 0 | 1 | 2 |
| init Value | 25 | 0 | 17 |
| shiftIdx | 1 | 1 | 1 |

Here, initValue and shiftIdx represent an initial occurrence probability value and a probability update rate, respectively. Table 1 illustrates a LUT including ctxIdx and corresponding initValue and shiftIdx values, with respect to pred_mode_plt_flag, which is a syntax element indicating whether or not a palette mode is used.

The video encoding apparatus calculates slopeIdx and offsetIdx according to Equation 1 and then calculates m and n using slopeIdx and offsetIdx.

$$slopeIdx = initValue >> 3$$

$$offsetIdx = initValue \: \& \: 7$$

$$m = slopeIdx - 4$$

$$n = (offsetIdx \cdot 18) + 1 \quad \text{[Equation 1]}$$

The video encoding apparatus calculates preCtxState according to Equation 2 using the calculated m and n.

$$preCtxState = Clip3(1,127,((m \cdot (Clip3(0,63,SliceQpY) - 16)) >> 1) + n) \quad \text{[Equation 2]}$$

Here, SliceQpY is a value derived from a quantization parameter of a slice.

The video encoding apparatus initializes pStateIdx0 and pStateIdx1, which are two probability values for symbol 1, according to Equation 3 using preCtxState.

$$pStateidx0 = preCtxState << 3$$

$$pStateIdx1 = preCtxState << 7 \quad \text{[Equation 3]}$$

Here, pStateIdx0 and pStateIdx1 are values calculated on the basis of a probability model updated independently of each other.

A value used as the probability of symbol 1 is pState, which is an average of the two values. Further, a symbol that occurs with a higher probability between symbols 0 and 1 is referred to as a more probable symbol (MPS), and the MPS can be calculated using pState. The video encoding apparatus may calculate pState and valMpS as shown in Equation 4.

$$pState = pStateIdx1 + 16 \cdot pStateIdx0$$

$$valMps = pState >> 1 \quad \text{[Equation 4]}$$

The video encoding apparatus may proceed with encoding for the input bin by using the probability value thus calculated.

The video encoding apparatus may update the probability using an encoding result to reflect the result in the context model to be used for encoding of the next bin. In this case, shift0 and shift1, which are probability update rates, may be calculated according to Equation 5. Then, update of pStateIdx0 and pStateIdx1, which are two probability values for symbol 1, may be performed according to Equation 6.

$$shift0 = (shiftIdx >> 2) + 2$$

$$shift1 = (shiftIdx \: \& \: 3) + 3 + shift0 \quad \text{[Equation 5]}$$

$$pStateIdx0 = pStateIdx0 - (pStateIdx0 >> shift0) + (1023 \cdot binVal >> shift0)$$

$$pStateIdx1 = pStateIdx1 - (pStateIdx1 >> shift1) + (16383 \cdot binVal >> shift1) \quad \text{[Equation 6]}$$

Using the two probability values pStateIdx0 and pStateIdx1 calculated in this way, the video encoding apparatus may calculate pState, which is a probability value substantially used for encoding, using Equation 4 again.

However, it is inefficient to determine the context model and update the probability using only information of limited syntax element of the current block, the left block, and the top block, as described above. A probability value used when entropy encoding is performed on the symbol is very important in terms of coding efficiency, and this is because a value of the symbol may be very closely influenced by other information related to the symbol. This problem of the existing technology can be solved by determining a context model using a variety of additional information in which characteristics of a video not used before is considered, and this problem of the existing technology can be solved by reflecting the context model in probability update.

II. Realization Examples According to the Present Disclosure

Hereinafter, realization examples for solving the above problems are described.

<Example 1>Method of Setting Context Model by Referring to Various Types of Information of Video The present realization example shows a method of setting a context model by referring to various types of information of a video in relation to a symbol to be encoded, and the information is used as a factor influencing a setting of the context model. In this case, the video encoding apparatus may determine an initial value of a probability using an existing LUT scheme according to the set context model.

According to the present example, when the context model is set, the following video information may be considered as high level video information.

First, the resolution information, the encoding parameter information, and the chrominance channel information may be considered as 2D video information. In this case, the resolution information may include all or some of a size of a picture, a frame rate, and color components (for example, (Y, Cb, Cr), bit depth (internal or external)). The coding parameter information may include all or some of an intra period, a size of a group of pictures (GOP), a coding configuration, and a profile (Main, Still, or the like). The chrominance channel information may include a chroma sub-sampling ratio and a sub-sampling position.

Next, XR (eXtended Reality) content information, light field video information, and point cloud video information may be considered as immersive video information. In this case, the XR content information may include all or some of a projection format, a depth map, texture data, view information (additional/basic), characteristics of a camera, and an array of the camera. The light field video information may include all or some of a camera structure, the characteristics of the camera, the depth map, a patch map, and a method of conversion from a lenslet to a multiview. The point cloud video information may include all or some of an occupancy map, an attribute map, an optical flow, and a depth map.

Figure 8:
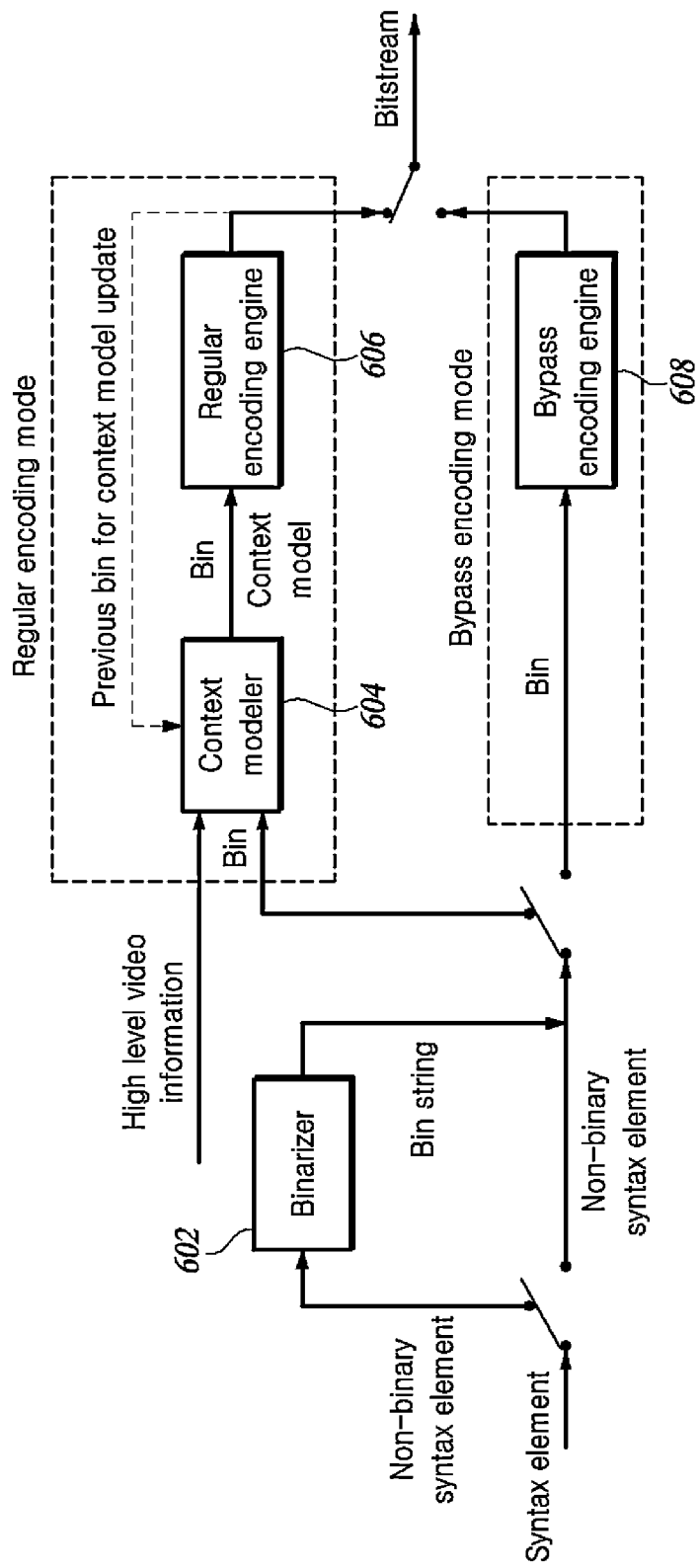
FIG. 8 is an illustrative diagram illustrating an entropy encoder using high level video information according to an embodiment of the present disclosure.

FIG. 8 is an illustrative diagram illustrating an entropy encoder using the high level video information according to an embodiment of the present disclosure.

As an example, when a probability of a symbol value to be encoded is closely related to a size of a picture that is spatial resolution, information on the size of the picture may be added as the high level video information, as illustrated in FIG. 8. When setting the context model, the video encoding apparatus may select a different context model depending on the spatial resolution. Further, the video encoding apparatus may form a new method or may set the context model depending only on the spatial resolution in combination with the method of setting the context model on the basis of existing syntax information of the current block, the left block, and the top block depending on applications. In the case of the new method, when 3 types of context models are determined according to the existing method and there are 5 types of defined spatial resolution, a total of 15 context models can be formed. Thus, with the present method, it is possible to expand the diversity of the context model.

<Example 2>Method of Forming a Plurality of Bin Encoders and Selecting One of the Bin Encoders The configuration of Example 1 has a problem that a plurality of context model settings for one symbol should be stored in a memory. Accordingly, in order to complement this, in the present realization example, a plurality of bin encoders are formed in consideration of selected information of a video, one of the bin encoders is selected, and a context model included in the selected bin encoder is set. In this case, the video information that can be considered is as shown in Example 1 or is further presented in the following examples.

Figure 9:
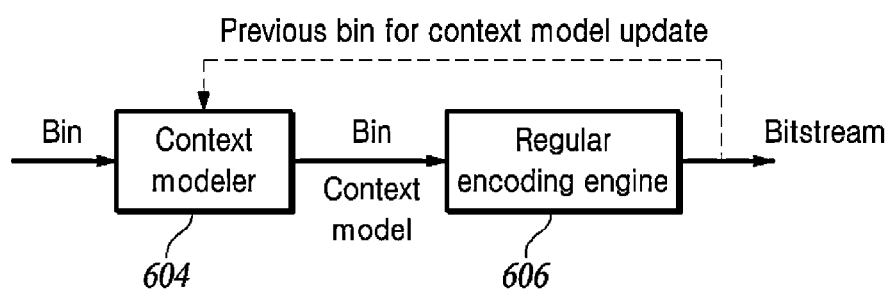
FIG. 9 is an illustrative diagram illustrating a bin encoder according to an embodiment of the present disclosure.

Before detailed examples are described, a bin encoder according to the present example is defined as follows for convenience of description. The bin encoder includes a context modeler 604 and a regular encoding engine 606, as illustrated in FIG. 9 and performs the regular encoding mode.

<Example 2-1>Method of Forming a Plurality of Bin Encoders in Consideration of Various Types of Information of a Video and Selecting One of the Bin Encoders An existing used context model may be subject to a probabilistic update process, a probabilistic model optimized for each symbol according to an input video may be provided, and when an update rate is low, the probability may be initialized before the optimized probabilistic model is reached.

Figure 10:
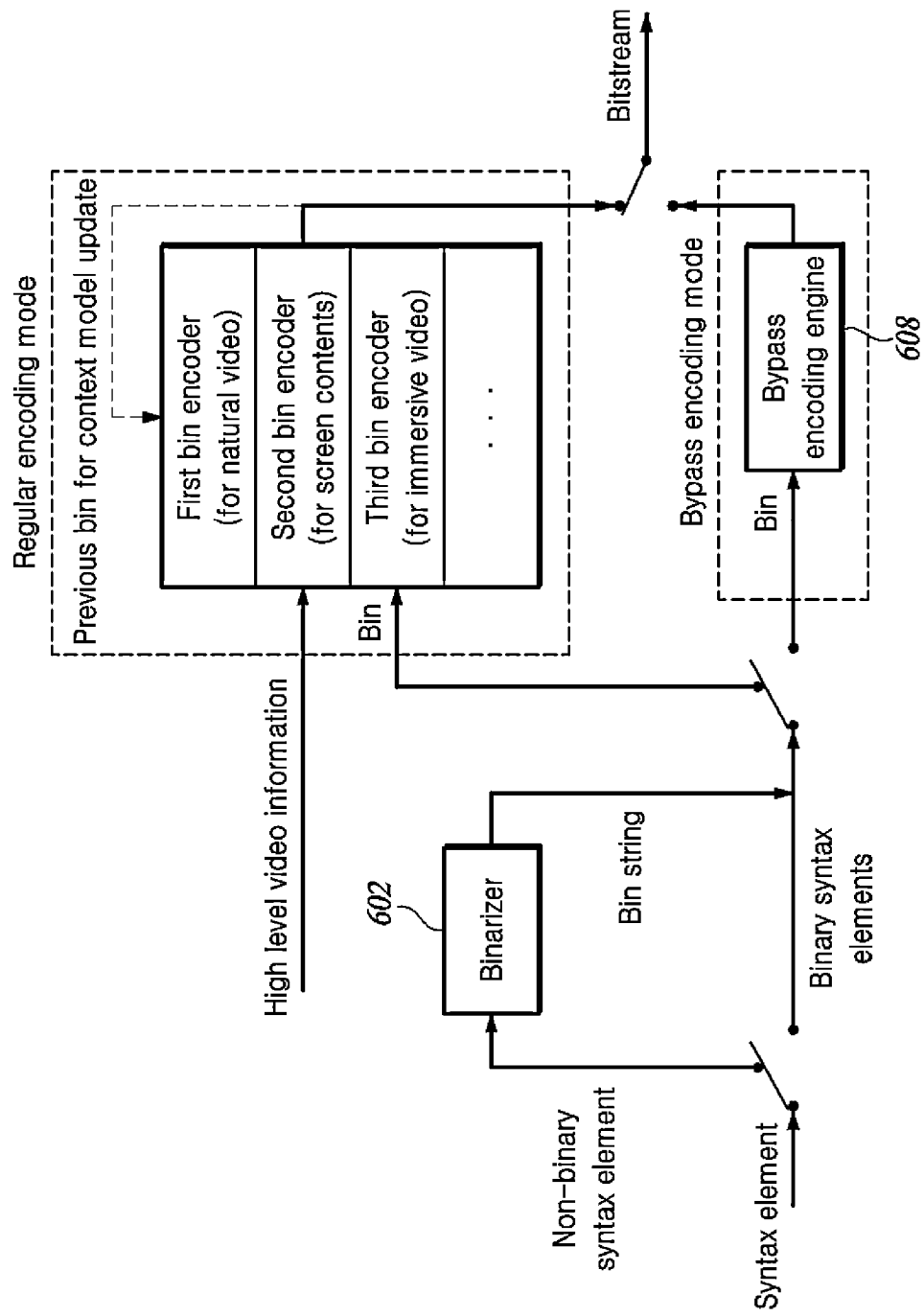
FIG. 10 is an illustrative diagram illustrating an entropy encoder using a plurality of bin encoders according to an embodiment of the present disclosure.

FIG. 10 is an illustrative diagram illustrating an entropy encoder using a plurality of bin encoders according to an embodiment of the present disclosure.

The use of the present realization example as in the example of FIG. 10 makes it possible for the video encoding apparatus to select an encoder according to the high level video information of Example 1 from among the plurality of bin encoders and use a probability model suitable for each video.

For example, a first bin encoder is implemented as a bin encoder dedicated to a natural video, a second bin encoder is implemented as a bin encoder dedicated to screen contents, and a third bin encoder is implemented as a bin encoder dedicated to an immersive video, so that an appropriate encoder can be selected depending on a type of input video. The three bin encoders described above include different context models but include the same encoding engine. Thus, selecting the bin encoder means selecting a context model.

As an example, since an intra block copy (IBC) technology exhibits high performance in the screen contents, a probability of generation of a syntax related to the technology in the second bin encoder dedicated to the screen contents may be set to be higher than those of the other two bin encoders. In this case, both an existing method and the method of Example 1 in which the high level video information is additionally considered may be applied in order to set the context model in each bin encoder.

<Example 2-2>Method of signaling additional signal information to form a plurality of bin encoders and selecting one of the bin encoders.

In Example 2-1, the bin encoder is determined in consideration of video information, whereas in Example 2-2, the video encoding apparatus separately acquires additional signal information related to the video and then determines the bin encoder accordingly. The additional signal information is shown in Table 2. Further, even when not specified in Table 2, any feature for distinguishing an individual video from other videos may be used as the additional signal information.

TABLE 2

| Signaling flag | Description |
|---|---|
| natural_video_flag | Flag for distinguishing between natural video and screen contents<br>0: Screen Contents<br>1: Natural Video |
| versatile_video_idx | Index distinguishing immersive video and indicating type of immersive video<br>0: 2D Video<br>1: XR Video<br>2: Light Field Video<br>3: Point Cloud Data |
| camera_dynamic_idx | Index indicating motion information of camera<br>0: fixed camera<br>(when background is static and only object moves)<br>1: moving camera<br>(when both object and background move)<br>2: camera with dynamic movement like drone<br>(when the field of camera changes abruptly) |

Figure 11:
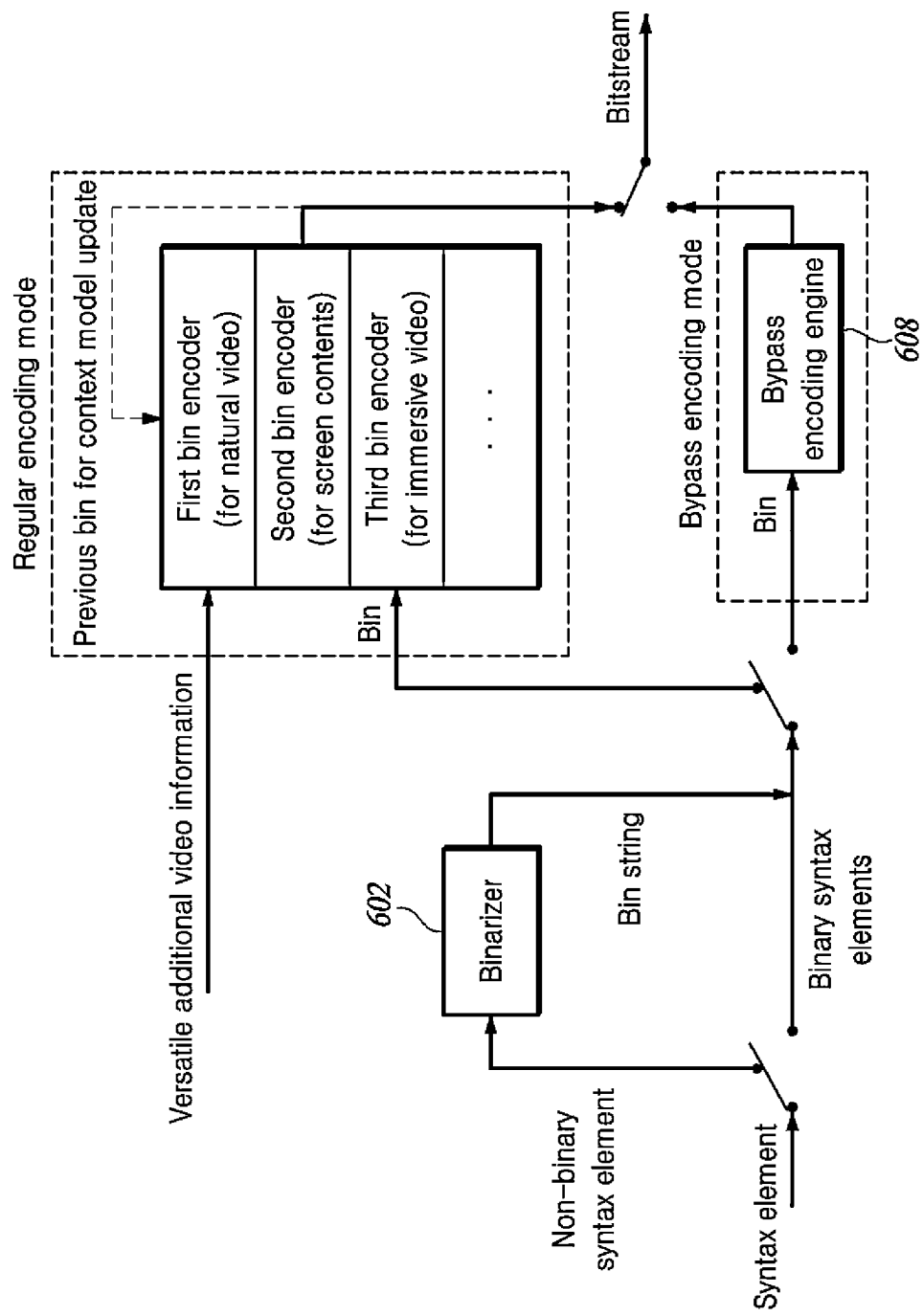
FIG. 11 is an illustrative diagram illustrating an entropy encoder using a plurality of bin encoders according to another embodiment of the present disclosure.

FIG. 11 is an illustrative diagram illustrating an entropy encoder using a plurality of bin encoders according to another embodiment of the present disclosure.

The additional signal information as described above may be transferred as versatile additional video information and then may be used to select one of the plurality of bin encoders as in the example of FIG. 11. As an example, when natural_video_flag, which distinguishes between the natural video and the screen contents as the versatile additional video information, is signaled with a value of 1, the video encoding apparatus may select the first bin encoder configured to be suitable for the natural video to use a more optimal context model to encode the video. In this case, an existing method may be used to set the context model in each bin encoder.

<Example 2-3>Method of Using Example 2-1 and Example 2-2 in Combination

Example 2-1 shows a method of determining a bin encoder in consideration of information of a video, Example 2-2 shows a method of determining a bin encoder by separately using additional signal information. Example 2-3 shows a plurality of regular entropy encoders each that is a combination between Example 2-1 and Example 2-2, and one of the regular entropy encoders is selected.

Figure 12:
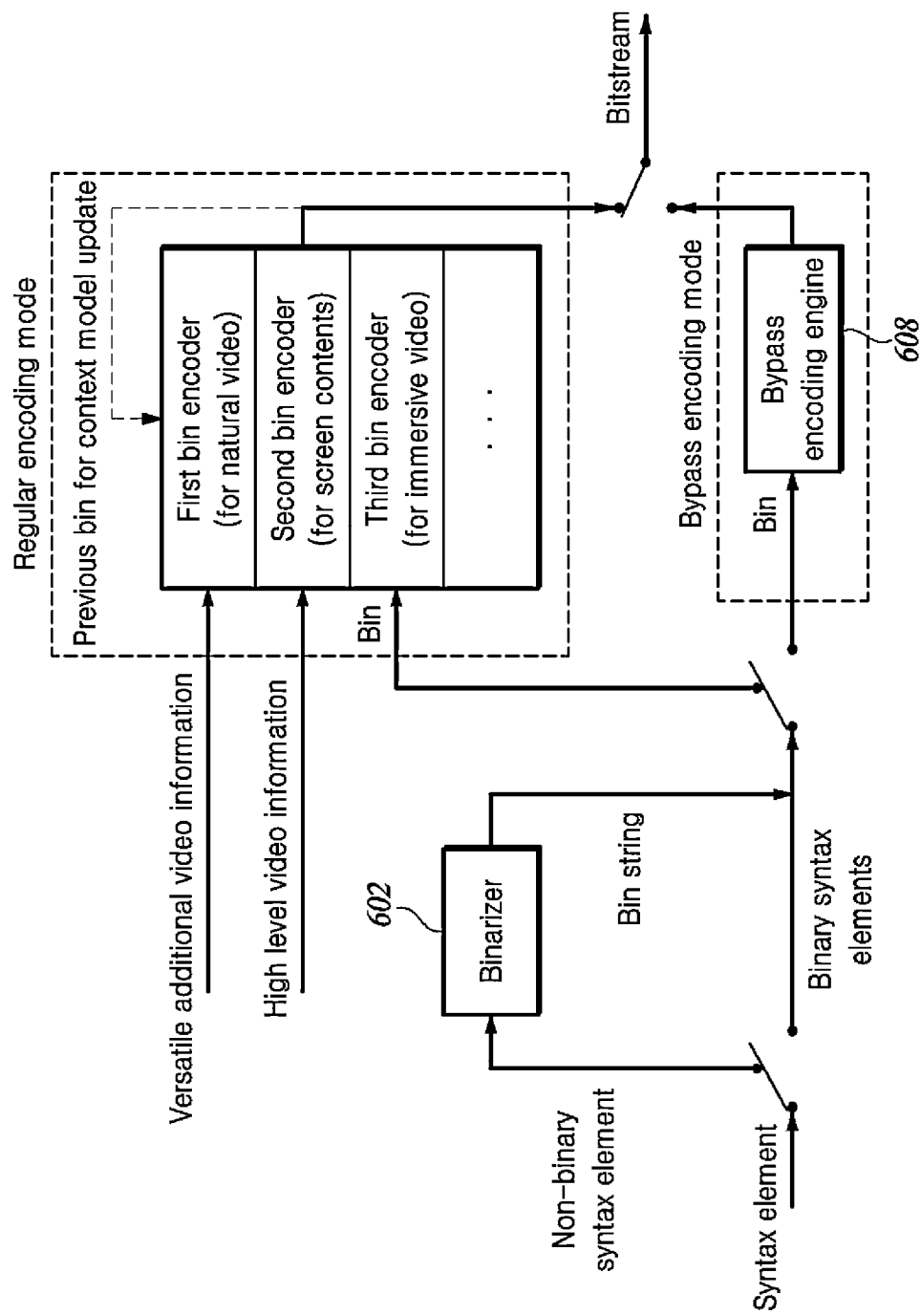
FIG. 12 is an illustrative diagram illustrating an entropy encoder using a plurality of bin encoders according to yet another embodiment of the present disclosure.

FIG. 12 is an illustrative diagram illustrating an entropy encoder using a plurality of bin encoders according to another embodiment of the present disclosure.

An operation method of Example 2-3 is as illustrated in FIG. 12. The video encoding apparatus may receive two pieces of data including the high level video information and the versatile additional video information as inputs and may select a bin encoder most suitable for encoding of the current video to select an optimal context model. As an example, the video encoding apparatus may select one of the plurality of bin encoders in consideration of the versatile additional video information and may set a context model more suitable for the syntax element, as in Example 1, in consideration of the high level video information within the selected bin encoder. Further, the video encoding apparatus may select the bin encoder in consideration of both pieces of data including the versatile additional video information and the high level video information.

Example 1 and Example 2 have been described focusing on the video encoding apparatus. However, the entropy decoder 510 illustrated in FIG. 7 may be modified so that Example 1 and Example 2 can also be implemented for the video decoding apparatus.

Hereinafter, an entropy encoding and decoding method according to Example 1 is described using the illustrations of FIGS. 13 and 14.

Figure 13:
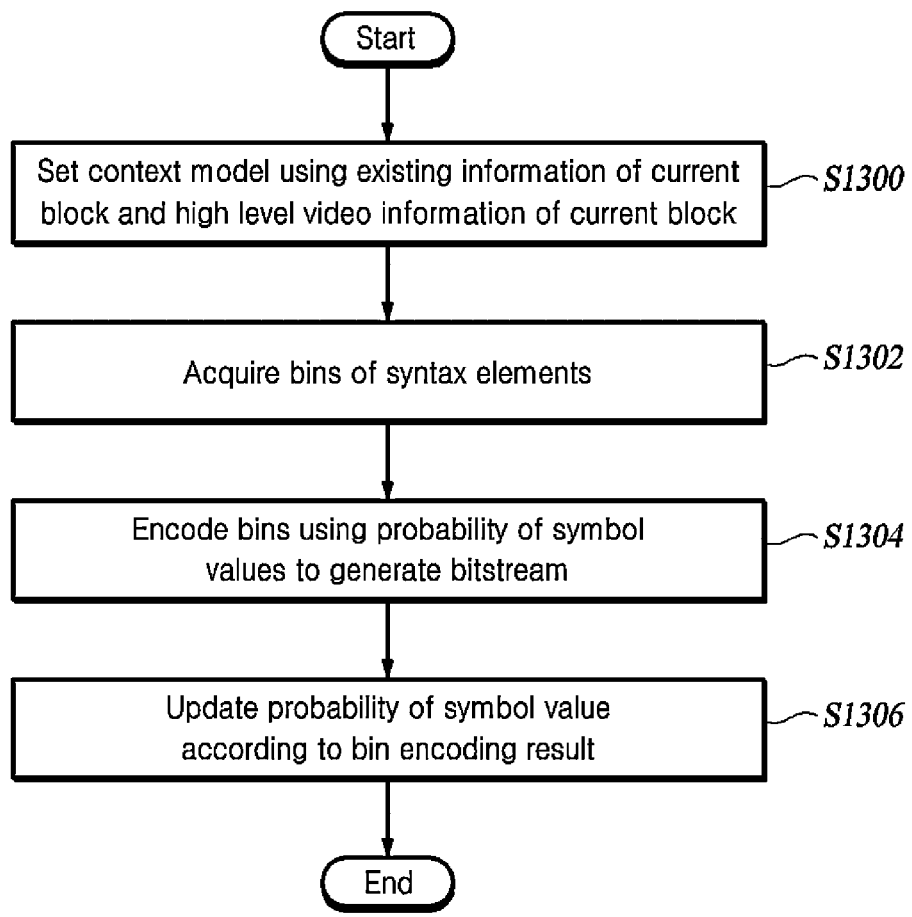
FIG. 13 is a flowchart illustrating an entropy encoding method for a current block according to an embodiment of the present disclosure.

FIG. 13 is a flowchart illustrating the entropy encoding method for a current block according to an embodiment of the present disclosure.

The video encoding apparatus sets the context model using existing information of the current block and the high level video information of the current block (S1300). Here, the context model designates the initial value of the probability of the symbol value and the probability update rate. Further, the existing information of the current block is information of syntax elements of the current block, the left block, and the top block.

The high level video information may include the 2D video information and the immersive video information. In this case, the 2D video information may include all or some of the resolution information, the encoding parameter information, and the chrominance channel information. The immersive video information may include all or some of the XR content information, the light field video information, and the point cloud video information.

The video encoding apparatus acquires bins of syntax elements (S1302). Here, the bins may be sequentially extracted from the bin string generated by binarizing non-binary syntax elements or sequentially extracted from binary syntax elements.

The video encoding apparatus encodes the bins using the probability of the symbol values to generate a bitstream (S1304).

The video encoding apparatus updates the probability of the symbol value according to a bin encoding result (S1306). The video encoding apparatus may update the probability of the symbol value using the probability update rate.

Figure 14:
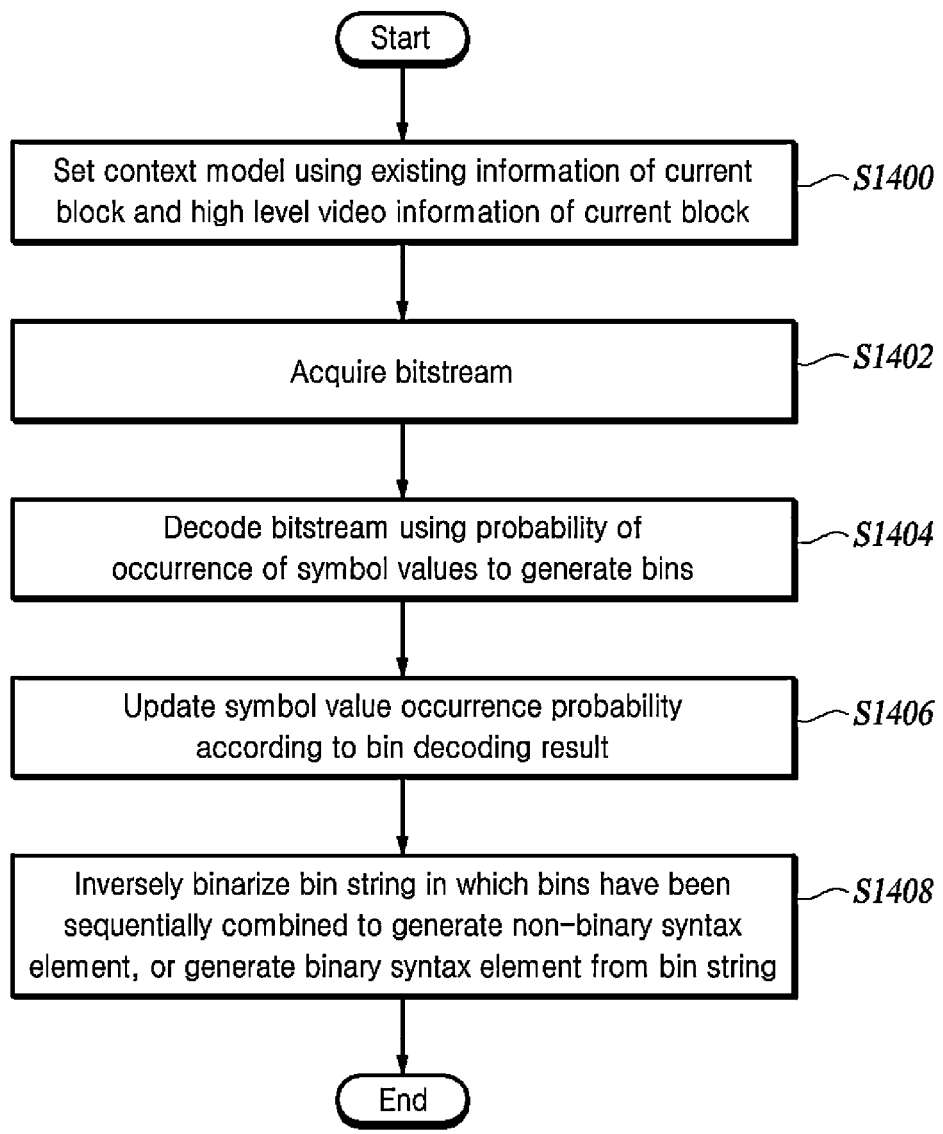
FIG. 14 is a flowchart illustrating an entropy decoding method for a current block according to an embodiment of the present disclosure.

FIG. 14 is a flowchart illustrating an entropy decoding method for a current block according to an embodiment of the present disclosure.

The video decoding apparatus sets a context model using the existing information of the current block and the high level video information of the current block (S1400). Here, the context model designates the initial value of the probability of the symbol value and the probability update rate.

The video decoding apparatus acquires a bitstream (S1402).

The video decoding apparatus decodes the bitstream using the probability of occurrence of symbol values to generate bins (S1404).

The video decoding apparatus updates the symbol value occurrence probability according to a bin decoding result (S1406). The video decoding apparatus may update the probability of the symbol value using the probability update rate.

The video decoding apparatus inversely binarizes the bin string in which the bins are sequentially combined to generate a non-binary syntax element, or the video decoding apparatus generates a binary syntax element from the bin string (S1408).

Hereinafter, an entropy encoding and decoding method according to Example 2 is described using the illustrations in FIGS. 15 and 16.

Figure 15:
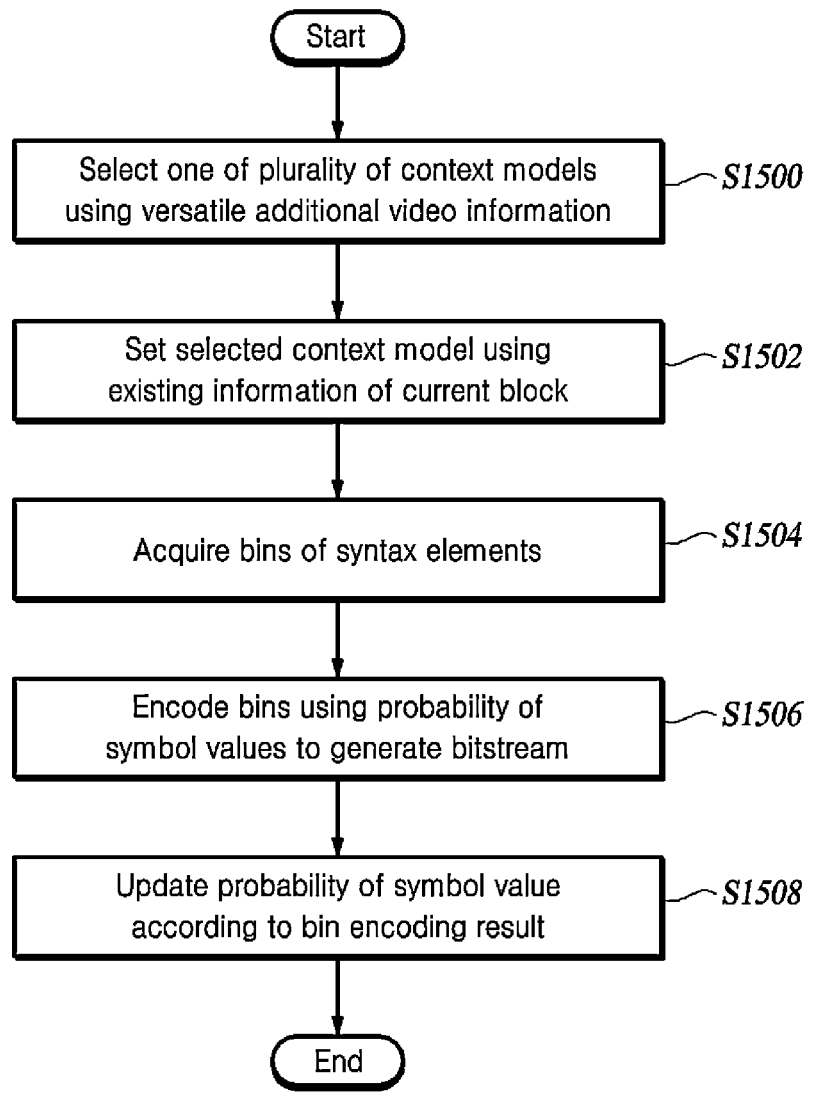
FIG. 15 is a flowchart illustrating an entropy encoding method for a current block according to another embodiment of the present disclosure.

FIG. 15 is a flowchart illustrating an entropy encoding method for a current block according to another embodiment of the present disclosure.

The video encoding apparatus selects one context model from among a plurality of context models using the versatile additional video information (S1500).

As shown in Table 2, the versatile additional video information may include all or some of a flag for distinguishing between the natural video and screen contents, may include an index for identifying an immersive video and indicating a type of the immersive video, and may include an index indicating motion information of a camera.

The plurality of bin encoders described above correspond to a plurality of context models. Accordingly, the plurality of context models includes a context model dedicated to the natural video, includes a context model dedicated to the screen contents, and includes a context model dedicated to the immersive video.

Meanwhile, the video encoding apparatus may additionally use the high level video information of the current block when selecting one context model.

Here, the high level video information may include the 2D video information and the immersive video information. In this case, the 2D video information may include all or some of the resolution information, the encoding parameter information, or the chrominance channel information. The immersive video information may include all or some of the XR content information, the light field video information, or the point cloud video information.

The video encoding apparatus sets the selected context model using the existing information of the current block (S1502). Here, the context model designates the initial value of the probability of the symbol value and the probability update rate. Further, the existing information of the current block is information of syntax elements of the current block, the left block, and the top block.

Meanwhile, the video encoding apparatus may additionally use the high level video information of the current block when setting the selected context model.

The video encoding apparatus acquires bins of syntax elements (S1504). Here, the bins may be sequentially extracted from the bin string generated by binarizing non-binary syntax elements or sequentially extracted from binary syntax elements.

The video encoding apparatus encodes the bins using the probability of the symbol values to generate a bitstream (S1506).

The video encoding apparatus updates the probability of the symbol value according to a bin encoding result (S1508). The video encoding apparatus may update the probability of the symbol value using the probability update rate.

Figure 16:
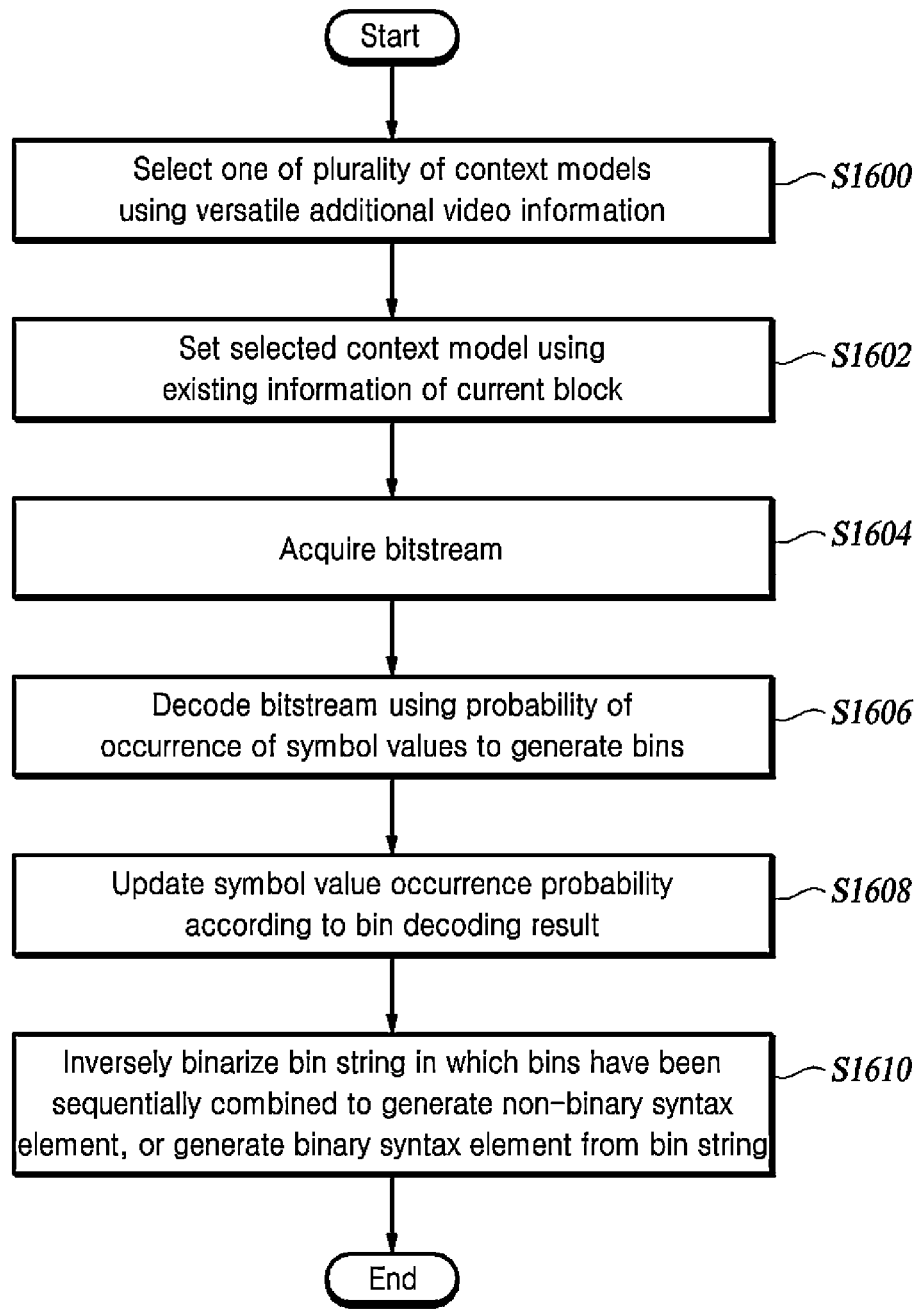
FIG. 16 is a flowchart illustrating an entropy decoding method for a current block according to another embodiment of the present disclosure.

FIG. 16 is a flowchart illustrating an entropy decoding method for a current block according to another embodiment of the present disclosure.

The video decoding apparatus selects one context model from among a plurality of context models using the versatile additional video information (S1600).

Meanwhile, the video decoding apparatus may additionally use the high level video information of the current block when selecting one context model.

The video decoding apparatus sets the selected context model using the existing information of the current block (S1602). Here, the context model designates the initial value of the probability of the symbol value and the probability update rate.

Meanwhile, the video decoding apparatus may additionally use the high level video information of the current block when setting the selected context model.

The video decoding apparatus acquires a bitstream (S1604).

The video decoding apparatus decodes the bitstream using the probability of occurrence of symbol values to generate bins (S1606).

The video decoding apparatus updates the symbol value occurrence probability according to a bin decoding result (S1608). The video decoding apparatus may update the probability of the symbol value using the probability update rate.

The video decoding apparatus inversely binarizes the bin string in which the bins are sequentially combined to generate a non-binary syntax element, or the video decoding apparatus generates a binary syntax element from the bin string (S1610).

Although the steps in the respective flowcharts are described to be sequentially performed, the steps merely instantiate the technical idea of some embodiments of the present disclosure. Therefore, a person having ordinary skill in the art to which the present disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

155: entropy encoder
510: entropy decoder
602: Binarizer
604: Context modeler
606: Regular encoding engine
608: Bypass encoding engine
710: Inverse binarizer

What is claimed is:

1. An entropy decoding method, performed by a video decoding apparatus, for decoding a syntax element of a block level related to a current block, the entropy decoding method comprising:
acquiring encoded data related to the syntax element of the block level;
deriving a context model based on encoding information of at least one neighboring block of the current block and high level video information of a higher level than the block level related to the current block, wherein the context model designates an initial value of a symbol value occurrence probability;
generating a bin string by decoding the encoded data using the context model; and
obtaining a value of the syntax element of the block level by inversely binarizing the bin string,
wherein generating the bin string comprises:
generating at least one bin of the bin string using the symbol value occurrence probability; and
updating, for use in generating a next bin, the symbol value occurrence probability according to a decoding result for the at least one bin.

2. The entropy decoding method of claim 1, wherein the encoding information of at least one neighboring block is information of syntax elements of a left block and a top block, which are adjacent to the current block.

3. The entropy decoding method of claim 1, wherein the high level video information includes all or some of resolution information, encoding parameter information, or chrominance channel information as 2D video information.

4. The entropy decoding method of claim 1, wherein the high level video information includes all or some of XR (extended Reality) content information, light field video information, or point cloud video information as immersive video information.

5. An entropy encoding method, performed by a video encoding apparatus, for encoding a syntax element of a block level related to a current block, the entropy encoding method comprising:

acquiring a bin string for the syntax element of the block level by binarizing a value of the syntax element of the block level;

deriving a context model based on encoding information of at least one neighboring block of the current block and high level video information of a higher level than the block level related to the current block, wherein the context model designates an initial value of a probability of a symbol value; and generating encoded data related to the syntax element of the block level by encoding the bin string using the context model, wherein generating the encoded data related to the syntax element of the block level comprises:

encoding at least one bin of the bin string by using a symbol value occurrence probability; and updating, for use in encoding a next bin, the probability of the symbol value according to an encoding result for the at least one bin.

6. The entropy encoding method of claim 5, wherein the encoding information of at least one neighboring block is information of syntax elements of a left block and a top block, which are adjacent to the current block.

7. The entropy encoding method of claim 5, wherein the high level video information includes all or some of resolution information, encoding parameter information, or chrominance channel information as 2D video information.

8. The entropy encoding method of claim 5, wherein the high level video information includes all or some of XR (extended Reality) content information, light field video information, or point cloud video information as immersive video information.

9. A method for providing a video decoding apparatus with video data, the method comprising:

encoding a syntax element of a block level related to a current block; and transmitting the syntax element to the video decoding apparatus, wherein encoding of the syntax element of the block level comprises:

acquiring a bin string for the syntax element of the block level by binarizing a value of the syntax element of the block level;

deriving a context model based on encoding information of at least one neighboring block of the current block and high level video information of a higher level than the block level related to the current block, wherein the context model designates an initial value of a probability of a symbol value; and generating encoded data related to the syntax element of the block level by encoding the bin string using the context model, wherein generating the encoded data related to the syntax element of the block level comprises:

encoding at least one bin of the bin string by using a symbol value occurrence probability; and updating, for use in encoding a next bin, the probability of the symbol value according to an encoding result for the at least one bin.

\* \* \* \* \*